(12) United States Patent
Jedliński et al.

(10) Patent No.: US 12,521,657 B2
(45) Date of Patent: Jan. 13, 2026

(54) FILTER VALVE ASSEMBLY

(71) Applicant: Collins Engine Nozzles, Inc., West Des Moines, IA (US)

(72) Inventors: Marek Jedliński, Wrocław (PL);
Lukasz Pabirowski, Wrocław (PL);
Michal Machalek, Wroclaw (PL);
Zuzanna Jamroz, Wroclaw (PL);
Konrad Pawlak, Wroclaw (PL);
Wojciech Janiga, Wroclaw (PL);
Tomasz Skórka-Siemieński, Zgorzelec (PL)

(73) Assignee: COLLINS ENGINE NOZZLES, INC., West Des Moines, IA (US)

( * ) Notice: Subject to any disclaimer, the term of this patent is extended or adjusted under 35 U.S.C. 154(b) by 602 days.

(21) Appl. No.: 17/951,244

(22) Filed: Sep. 23, 2022

(65) Prior Publication Data

US 2023/0098200 A1 Mar. 30, 2023

(30) Foreign Application Priority Data

Sep. 24, 2021 (EP) .................................... 21461598

(51) Int. Cl.
*B01D 35/14* (2006.01)
*B01D 29/35* (2006.01)
*B01D 35/147* (2006.01)
*F02M 37/48* (2019.01)

(52) U.S. Cl.
CPC ........... *B01D 35/147* (2013.01); *B01D 29/35* (2013.01); *F02M 37/48* (2019.01); *B01D 2201/167* (2013.01); *B01D 2201/342* (2013.01)

(58) Field of Classification Search
CPC .................. B01D 35/147; B01D 29/35; B01D 2201/167; B01D 2201/342; B01D 27/103; B01D 35/153; B01D 27/08; F02M 37/48
See application file for complete search history.

(56) References Cited

U.S. PATENT DOCUMENTS

| | | | |
|---|---|---|---|
| 6,068,763 A | 5/2000 | Goddard | |
| 7,029,575 B1 | 4/2006 | Baumann et al. | |
| 7,323,103 B2 | 1/2008 | Pierret | |
| 8,316,880 B2 | 11/2012 | Grosskopf et al. | |
| 9,453,462 B2 | 9/2016 | Rickis | |
| 10,646,803 B2 | 5/2020 | Greco et al. | |

(Continued)

FOREIGN PATENT DOCUMENTS

| | | |
|---|---|---|
| DE | 19504273 A1 | 8/1996 |
| EP | 1350551 A1 | 10/2003 |
| IT | MI20111315 A1 | 1/2013 |

OTHER PUBLICATIONS

Abstract for DE19504273 (A1), Published: Aug. 14, 1996, 1 page.

(Continued)

*Primary Examiner* — Waqaas Ali
(74) *Attorney, Agent, or Firm* — CANTOR COLBURN LLP

(57) ABSTRACT

A filter assembly a manifold having a fluid inlet and a fluid outlet and a filter housing having a filter medium provided therein. The filter medium defining an inner filter chamber and defining an outer filter chamber between the filter medium and the filter housing, the filter housing being removably attached to the manifold so as to provide a fluid flow path from the inlet into the inner filter chamber.

12 Claims, 7 Drawing Sheets

(56) References Cited

U.S. PATENT DOCUMENTS

| | | | |
|---|---|---|---|
| 2003/0127384 A1* | 7/2003 | Kapur | B01D 35/147 |
| | | | 210/416.5 |
| 2004/0035769 A1 | 2/2004 | Mouhebaty | |
| 2008/0083664 A1 | 4/2008 | Bontaz et al. | |
| 2018/0304179 A1 | 10/2018 | Auxter et al. | |

OTHER PUBLICATIONS

Abstract for EP1350551 (A1), Published: Oct. 8, 2003, 1 page.
European Search Report for Application No. 21461598.1, mailed Feb. 24, 2022, 6 pages.

* cited by examiner

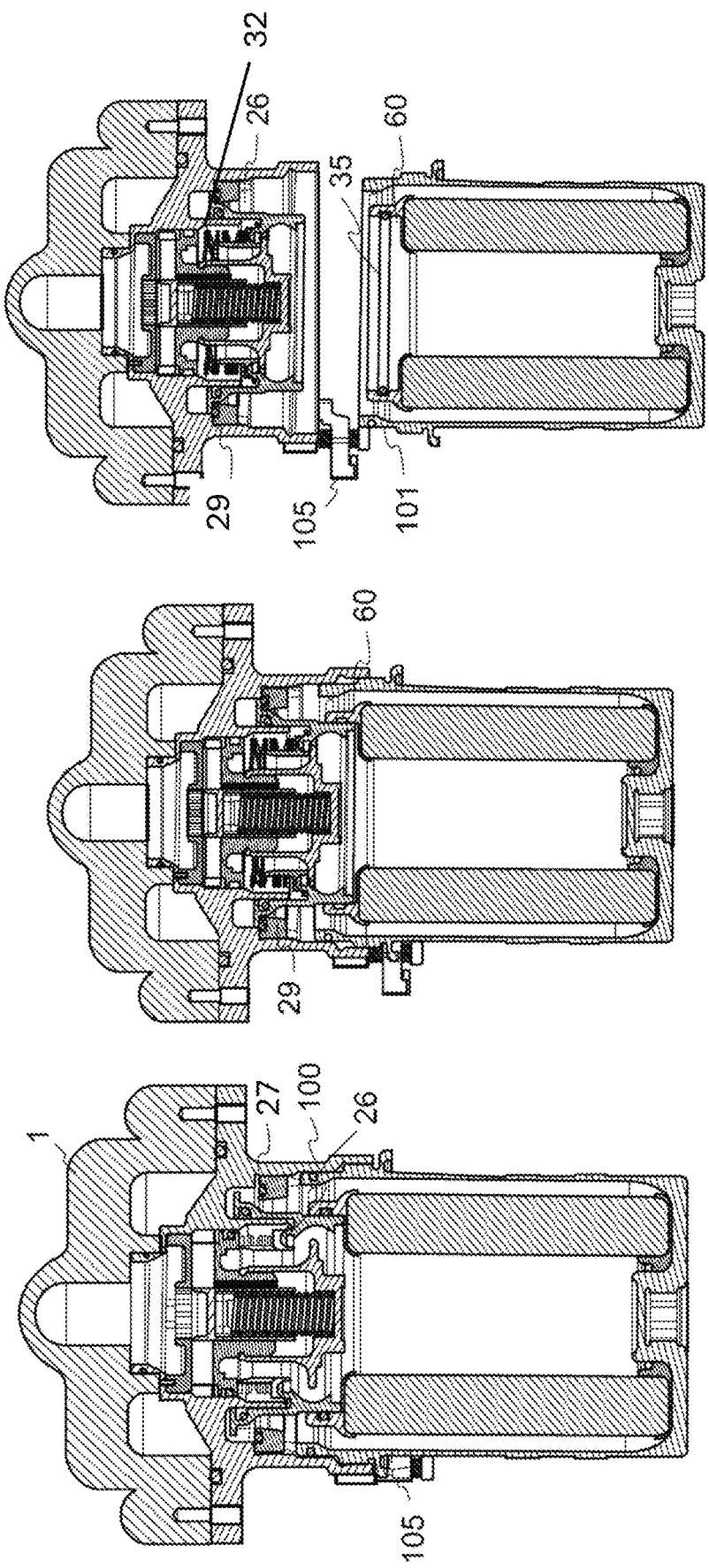

FILTER VALVE ASSEMBLY

CROSS-REFERENCE TO RELATED APPLICATIONS

This application claims priority to European Patent Application No. 21461598.1 filed Sep. 24, 2021, the entire contents of which is incorporated herein by reference.

TECHNICAL FIELD

The present disclosure is concerned with a valve assembly for a filter assembly such as, but not limited to, filters for fuel or oil or lubricant in machines or vehicles, e.g. a fuel filter in a vehicle or an aircraft.

BACKGROUND

Filters are provided in various applications to filter fluid flowing along a fluid flow path in order, for example, to remove particles or contaminants from the fluid. The present disclosure is concerned with the type of filter having a fluid inlet and a fluid outlet and a filter path between the inlet and the outlet, wherein the filter path passes through a filter medium arranged to remove the material to be filtered from the fluid before it arrives at the outlet. Such filters find use in e.g. vehicle fuel systems, where fuel is drawn from a reservoir by a pump and delivered to the engine. Filters are provided in the flow path to remove any particulate matter or debris and to ensure that the fuel reaching the engine is as clean as possible to avoid damage to the engine and permit optimal engine performance. Such filter assemblies may comprise a manifold with an inlet and outlet for connection to the fuel lines and a filter material. This may be provided in a filter cartridge removably attached to the manifold. Filters are also used to filter lubricant fluid e.g. oil and whilst the assembly of the disclosure is described in relation to fuel supply systems, this is by way of example only and the principles may apply equally to filters for lubricant or other fluids. In vehicles, and particularly in aircraft, the effectiveness and reliability of the filters is important for performance, efficiency and safety.

Over time, the filter material may become clogged presenting an impedance to the flow of fluid through the filter. To avoid the engine being cut off from the fuel supply when the filter medium is clogged, most fuel supply systems will provide a way to bypass the filter medium in the event of it becoming clogged since it is important for the engine to receive some fuel, even if it contains debris, rather than no fuel at all. The bypass system will allow fuel to flow to the engine until such time that the filter material can be replaced e.g. by removing and replacing the filter cartridge.

Current filter bypass systems tend to be large and complex and this adds considerably to the cost, weight and size of the filter assembly.

Further, as mentioned above, when the filter medium becomes clogged or has exceeded its useful or permitted life, it needs to be removed and replaced. Conventionally, this requires the fuel system, and therefore the engine, to be switched off while the filter medium is removed, leading to undesirable downtime.

There is a need for a bypass system for a filter assembly that is simple, small and lightweight whilst maintaining reliability. There is also a need for an automatic shut-off system that allows a filter to be removed and replaced without the need to shut-off the entire fuel system and to avoid leakage during removal of the filter cartridge.

SUMMARY

The assembly according to this disclosure is a valve assembly comprising a bypass valve and a shut-off valve that are integrated inside the housing or manifold of a filter assembly and that are automatically actuated.

According to an aspect of the disclosure, there is provided a filter assembly comprising: a manifold having a fluid inlet and a fluid outlet, a filter housing having a filter medium provided therein, the filter medium defining an inner filter chamber and defining an outer filter chamber between the filter medium and the filter housing, the filter housing being removably attached to the manifold so as to provide a fluid flow path from the inlet into the inner filter chamber, through the filter medium into the outer chamber and out of the outlet; characterised by the filter assembly further comprising a valve assembly mounted inside the manifold, and a by-pass channel defined inside the manifold between the fluid inlet and the fluid outlet, the valve assembly comprising a bypass spool and a bypass spring arranged in engagement with the bypass spool to bias the bypass spool into a first position and to compress, in response to a pressure differential across the bypass spool exceeding the bypass spring force, to move the bypass spool to a second position being a bypass position in which a bypass channel is opened to direct flow from the fluid inlet to the fluid inlet without passing through the filter medium, the valve assembly further comprising a shut off member located around the bypass spool and bypass spring and held between the manifold and the filter housing by means of a shut off spring, and an inlet axial seal and an outlet axial seal positioned such that in an open position, when the filter housing is attached to the manifold, the shut off valve member is axially positioned by means of the shut off spring such that the inlet and outlet axial seals are not in sealing engagement with the valve assembly and in a shut off position, when the filter housing is removed from the manifold, the shut off member is axially moved by the shut off spring to cause the inlet and outlet seals to be brought into sealing engagement with the valve assembly to shut off fluid flow from the inlet and the outlet.

Also disclosed is a fuel filter, a method of filtering fluid and a method of detaching the filter housing from the manifold.

Preferred embodiments of the invention will now be described in more detail, by way of example only, with reference to the drawings.

BRIEF DESCRIPTION OF THE DRAWINGS

FIGS. 7A, 7B and 7C show operation of the shut off valve function.

DETAILED DESCRIPTION

Figure 1:
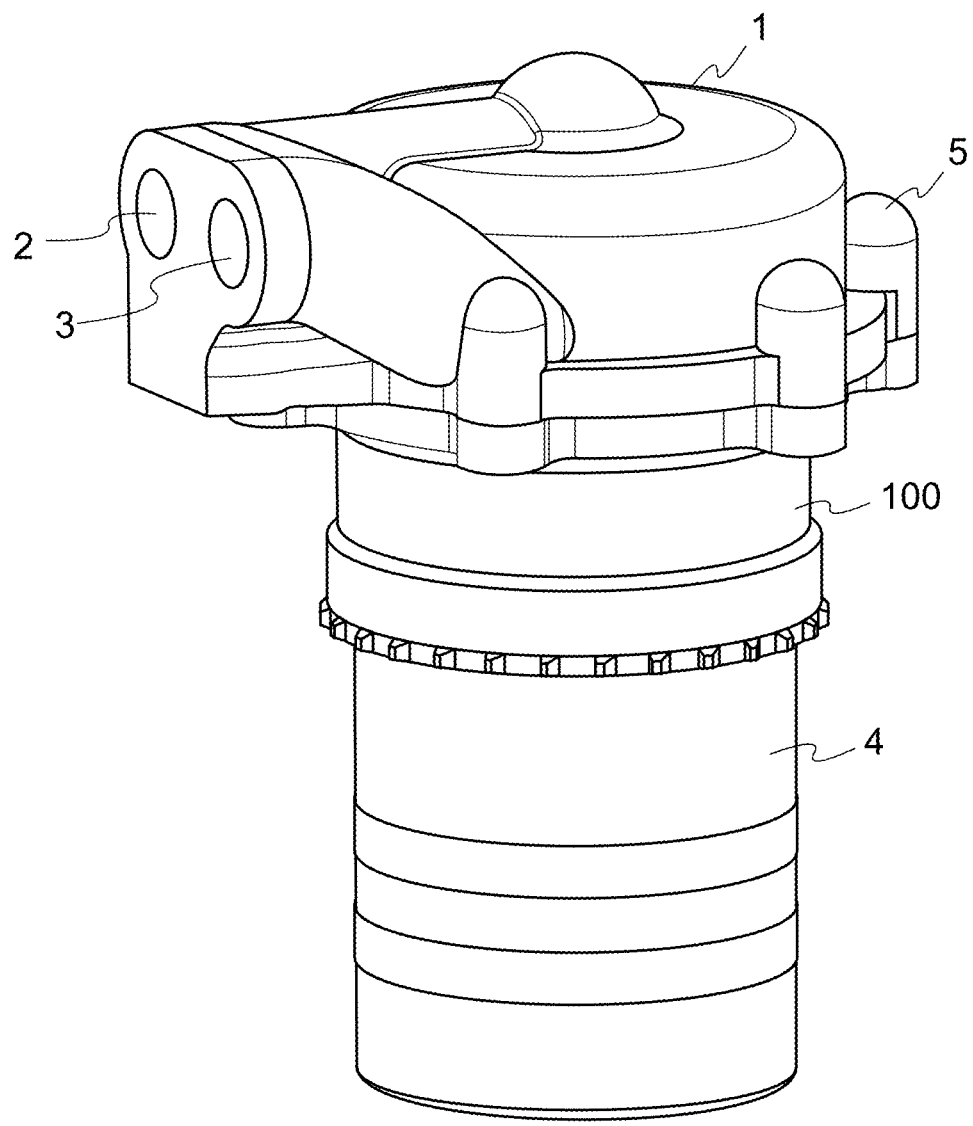
FIG. 1 is a perspective view of a filter assembly.
Figure 2:
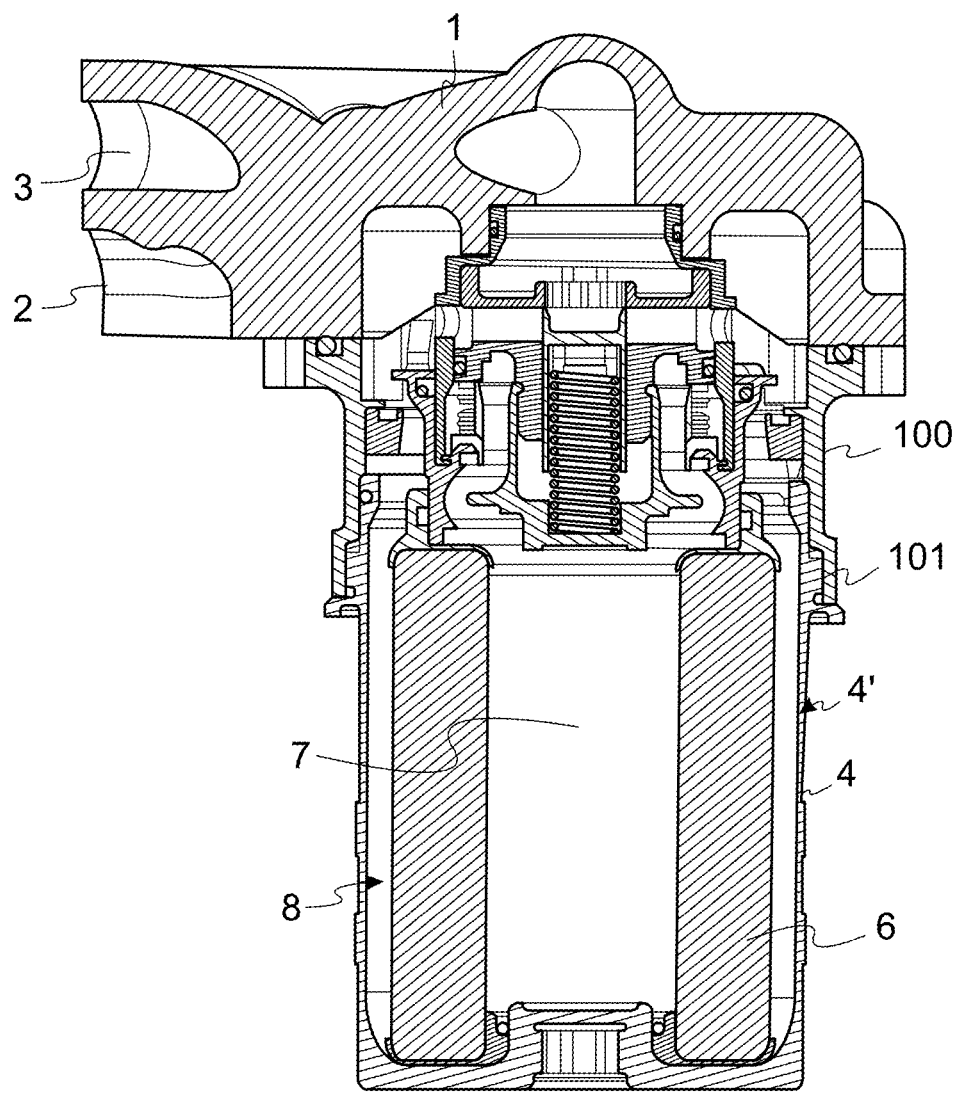
FIG. 2 is a cut-away view of a filter assembly as shown in FIG. 1 and in accordance with the disclosure.
Figure 3:
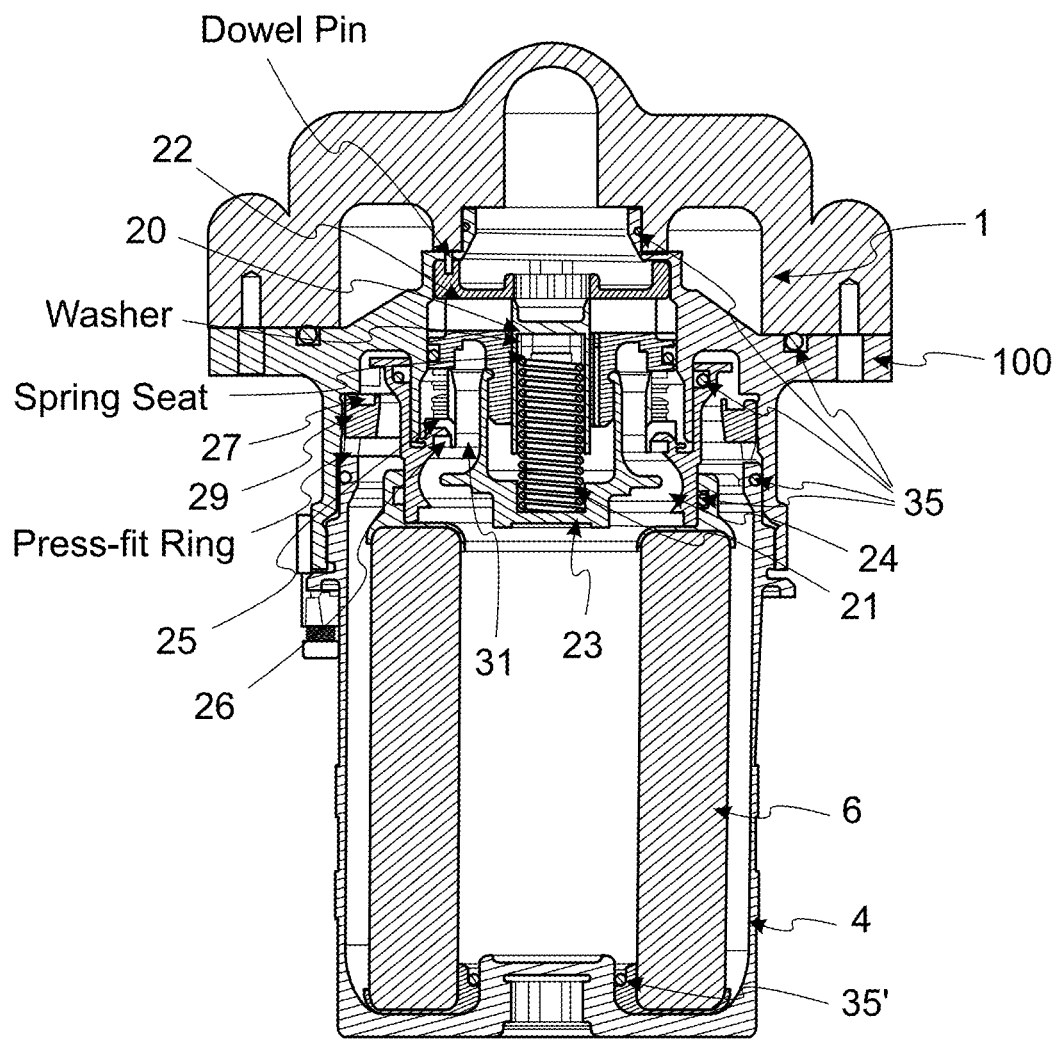
FIG. 3 show a sectional view of an assembly according to this disclosure.

FIG. 1 shows a filter assembly such as those used in fuel systems or the like. Such filters may be placed between the fuel reservoir and the fuel pump and/or between the pump and the engine, to remove debris, particulate matter etc. from the fuel before it reaches the engine. The outer shape and structure of the filter is as is known in the field and is designed to fit in a fuel supply system of the vehicle/aircraft etc. The aim of the present disclosure is to provide a by-pass and shut off system that can be integrated into such a filter assembly without changing the design or the envelope of the exterior of the assembly.

The filter assembly includes a filter manifold 1 having a fluid inlet 2 and a fluid outlet 3. The inlet 2 is configured to be connected to a fluid line from the reservoir or pump (not shown) supplying fluid/fuel to be filtered. The following description will refer to a fuel filter, but it should be understood that the fluid could be other than fuel and reference to fuel is by way of example only.

The outlet 3 is configured to be connected to a fluid line for providing the filtered fluid to the pump (if the filter is between the reservoir and the pump) or to the end user of the fluid e.g. the engine (if the filter is between the pump and the engine). The manifold 1 is attached to a filter canister or bowl 4 by a connector 100, which houses the valve assembly described further below, and fasteners 5. A threaded connector 101 is provided between the connector and the bowl 4. As will be described further below with reference to the other drawings, fluid provided to the filter inlet passes from the manifold 1 into the filter canister or bowl 4. The filter bowl 4 contains a filter medium 6 which may be e.g. in the form of a cartridge fitted into the bowl. The filter medium 6 which may be e.g. paper or other known filter material is formed to define an inner chamber 7. An outer chamber 8 is defined between the filter medium 6 and the inner wall 4' of the filter bowl 4. Fluid from the inlet, passing into the filter, is directed into the inner chamber 7. Due to the pressure of the pump and the build-up of pressure in the inner chamber the fluid is forced outwards through the filter medium 6 into the outer chamber 8 and is then forced up to and out from the outlet 3. This is known and standard for such filter assemblies.

As mentioned above, problems can arise when the filter medium 6 becomes clogged or defective such that the fluid in the inner chamber 7 is not able to pass through the filter medium into the outer chamber and to the outlet. The fluid (fuel) would then not reach the engine.

Further, when the filter medium needs replacing, with known assemblies, the fluid supply needs to be cut off to prevent fluid flowing into the inlet so that the bowl 4 can be disconnected from the manifold without fluid leakage, and replaced with new filter medium and reattached before the fluid flow can be re-started.

According to this disclosure, a valve assembly is provided to regulate fluid flow when it cannot pass through the filter medium and also to shut off fuel flow when the filter bowl is detached from the manifold. The valve assembly is integrated into, and inside the envelope of, the manifold and connector of the filter assembly.

Figure 4:
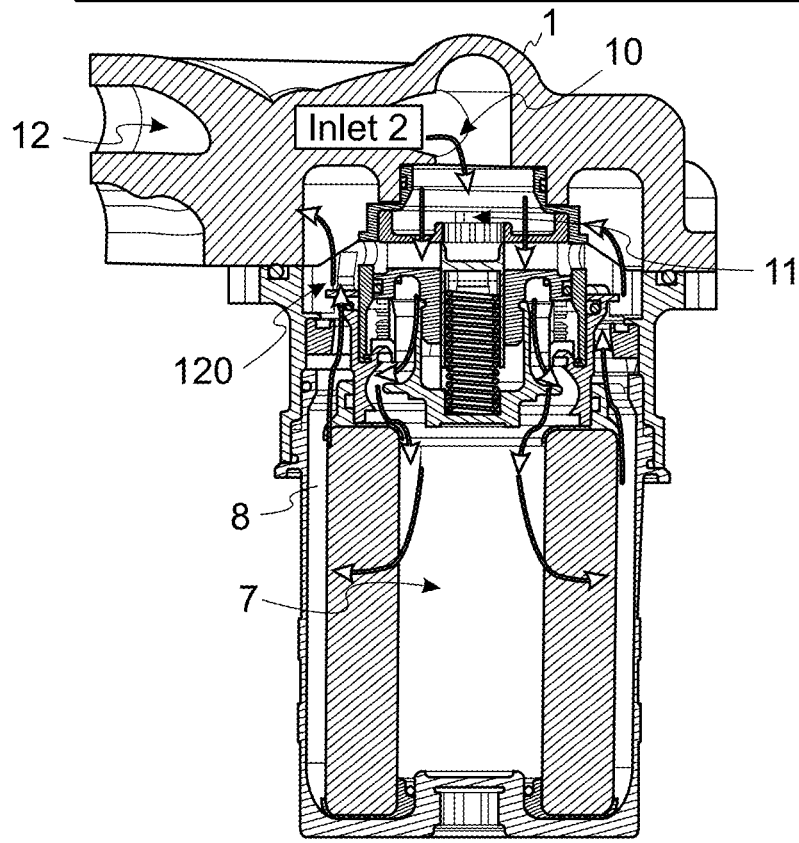
FIG. 4 shows the flow through the filter assembly in normal operation.

In normal operation, the fluid e.g. fuel flows into the inlet 2 in the manifold 1, as best seen by the arrows in FIG. 4. The fuel flows into a supply chamber 10 and along a supply channel 11, from where it flows into the inner chamber 7 of the filter. The fuel flows, under pressure of the pump, through the filter medium 6, where debris or contaminants are filtered from the fluid and retained in the filter medium 6. The filtered fluid then flows from the outer chamber 8 to an outlet chamber 12, via an outlet channel 120, and out of the filter via the outlet 3 of the manifold 1.

As mentioned above, the filter can become clogged and will, after a while, need to be removed and replaced. The valve assembly of this disclosure, as described in more detail below, acts to direct the fuel via a bypass channel 13 in the event that the filter becomes clogged, as indicated by an excessive pressure differential between valve control areas (as described further below and due to the pressure in the inner chamber increasing because the flow through the filter medium is hindered), thus bypassing the filter medium. This ensures that in such an event, fuel will continue to be provided to e.g. the engine even in the event that the filter is not usable. Of course, the output fuel will not be filtered, but some (unfiltered) fuel is preferable to no fuel at all.

The valve assembly also operates to shut off fuel flow through the filter in the event that the filter bowl 4 is removed e.g. for maintenance, so as to prevent fuel leakage. The shut off function shuts off the supply channel and, optionally, may also shut off the outlet chamber.

The valve assembly is located entirely within the envelope of the filter defined by the manifold, the connector and the filter bowl, and comprises a valve spool 20, a bypass spring 21 and a sleeve 22 housing the spool 20 and the spring 21. The assembly also includes a cap 23, a shut off member 24, a shut off spring 25 and inlet and outlet shut off seals 26, 27 as described further below.

Figure 5:
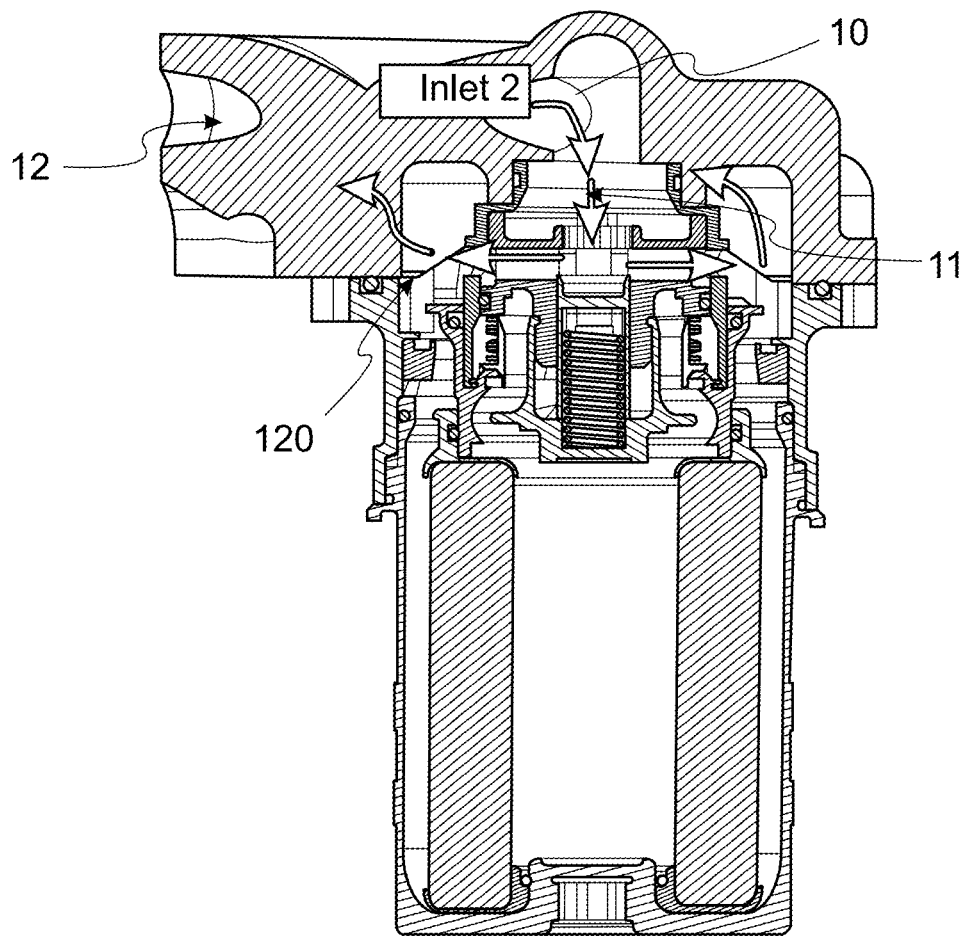
FIG. 5 shows the flow through the filter assembly in bypass operation.

Seals, typically O-rings, 35, 35', are provided at various locations in the system to prevent leakage of fluid passing through the system The bypass operation will now be described in more detail with reference to FIG. 5. The valve spool 20 is positioned in relation to the bypass channel 13 and moved relative thereto by means of the bypass spring 21 and the pressure differential across the spool corresponding to inlet and outlet pressure. In normal operating conditions, as shown in FIG. 4, the pressure differential across the spool does not exceed the force of the bypass spring 21 and the bypass spring 21 is relaxed biasing the valve spool to its closed position. In this position, the spool body blocks the bypass channel 13. Fluid cannot, therefore, flow from the supply channel through the bypass channel and so is directed through the supply channel and through the filter medium as described above.

If, however, the pressure in the inner chamber 7 becomes excessive (close to or exceeding the so-called 'cracking pressure') the pressure differential across the spool exceeds the spring force, i.e. the pressure differential between the supply channel 11 and the area below the spool 20 exceeds a set limit. This pressure differential generates forces on the valve spool 20 which is then pushed by these forces against the spring force, as seen in FIG. 5. The spring 21 is therefore compressed and the spool is moved downwards which opens the bypass channel 13 which was previously covered by the spool. The inlet is then connected to the bypass channel 13 allowing for flow directly from the inlet to the outlet, via the bypass channel, thus bypassing the filter medium. Fuel entering the inlet is thus directed, as shown by the arrows in FIG. 5, from the supply chamber through the bypass channel 13, from where it flows to the outlet chamber and to the outlet 3 without passing through the filter medium 6.

Thus, bypass valve spring 21 controls the movement of the spool 20 based on the filter pressure difference, to open the bypass channel 13 if the pressure difference exceeds the predetermined threshold. The spring itself, however, is not located in the fluid flow path, but, rather, in a 'blind' cavity covered by the piston body. If the spring were in the fluid flow path, the fluid flow could excite the spring and cause resonance in the fluid. A spring in the fluid flow path would also disturb the flow. Further, if the spring were to be damaged, spring material could create debris in the system fluid flow, which could further damage the system.

When the pressure difference decreases again, the spool will move, under the force of the spring, back to the default position where the bypass channel is closed by the spool body and the fluid is then forced again from the inlet chamber into the inner chamber, through the filter medium to the outer chamber and the outlet chamber and out through the outlet.

The spool-sleeve type bypass valve ensures good linear performance, without the need for the fluid path to have many turns and bends, and also ensures a low pressure drop.

The valve assembly is also configured to perform a shut off function that shuts off fuel flow when the filter bowl 4 is removed from the manifold 1 e.g. for maintenance. The shut off function is described with reference to FIGS. 6 and 7A to 7C.

Figure 6:
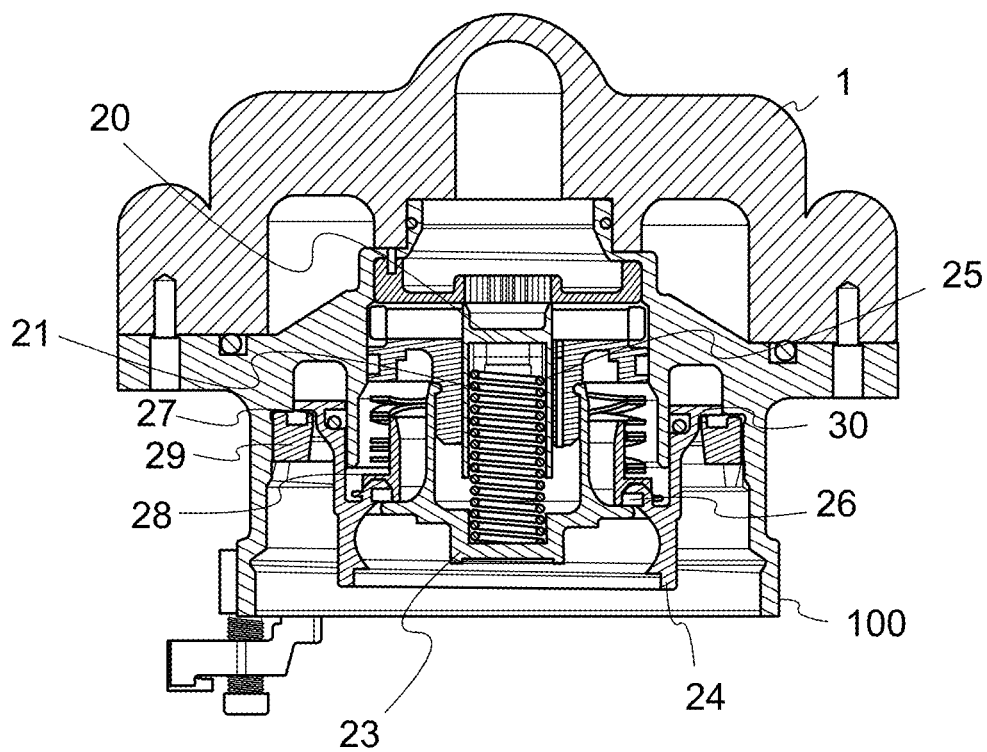
FIG. 6 shows a detail of the filter assembly showing the valve sealing for the shut off valve function.

FIG. 6 shows in detail the valve assembly components that cooperate to provide the shut off function. The shut off valve components are arranged within the connector around the spool and bypass valve of the bypass function. The shut off components include a shut off member 24 which defines an axially moveable shut off piston, and a shut off spring 25 for axially moving the shut off member 24. An inlet seal 26 is provided between the shut off member and the inlet/supply channel. This may be a knife edge seal such as a ring of e.g. Teflon or the like to provide axial sealing. An outlet seal 27 is provided between the shut off member 24 and the assembly outlet 3. In the example shown, this is a lip seal and provides axial sealing. Other types of seal can also be envisaged to provide the required axial sealing at the inlet and outlet. What is important is then when the shut off valve is in the closed position (as described further below) both the inlet and outlet are sealed to avoid an fluid leakage at either the inlet or the outlet.

FIG. 7A shows the manifold 1, connector/valve housing 100 and filter bowl 4 assembled as described above.

To remove the filter bowl 4, it is unscrewed from the connector 100 using the thread 101. The filter bowl 4 may also be secured to the connector by a latch 105 which is also opened to release the bowl. FIG. 7B shows the assembly as the bowl is being unscrewed. FIG. 7C shows the filter bowl removed from the manifold 1.

The filter bowl 4 contains the filter medium 6 which is in the form of a cylinder with a top part 60 provided to add rigidity to the filter medium 6 for attachment of the flow paths and valve assembly parts. In normal operation, when the filter bowl 4 is attached to the manifold 1 via the connector 100, the shut off member 24 extends into the top part 60 of the filter. The shut off spring 25 is in its compressed state (FIG. 7A) such that the shut off member 24 is held out of engagement with the valve cap 23 that is located around, and extends radially outwards relative to the bypass spring 21. The inlet and outlet axial seals 26, 27 are therefore not in sealing engagement and do not, therefore, prevent flow of the fluid from the inlet channel into the filter or from the filter to the outlet.

As the filter bowl starts to be unscrewed from the connector (FIG. 7B) this releases the force acting on the shut off spring 25 via the shut off member 24 and as the shut off spring 25 expands it forces the shut off member axially downwards bringing the inlet seal 26 into sealing engagement with the cap 23 and bringing the shut off member into sealing engagement with the outlet seal 27, thus prevent flow of fluid at the inlet and outlet. Once the shut off valve member 24 is in a position that the inlet and outlet seals are in proper sealing engagement, the filter bowl 4 can be fully detached (FIG. 7C) without the risk of fluid leakage from the manifold/connector. The geometry of the shut off valve parts and the design of the shut off spring are such that the shut off valve will be in its fully sealed closed position before the filter bowl 4 is disconnected. A shroud 32 is provided around the shut off spring 25 to protect the spring from fluid in the system and from debris.

The outlet seal 27 is, in the example shown, provided on an adaptor ring 29 and the shut off member 24 is formed with an upper radially extending flange 30 configured such that as the shut off spring 25 expands, the flange 30 moves into abutment with the adaptor ring 29 and the outlet seal 27 located therein. This provides the required outlet sealing for the shut off function and also secures the shut off member 24 against falling out of the connector/manifold after the bowl 4 is removed.

Thus, a valve assembly mounted inside the filter assembly, performs both a bypass function and a shut off function when required.

The valve assembly of this disclosure can be located inside existing manifold designs and thus does not increase the envelope of the filter assembly. The valve assembly is relatively simple, small and lightweight and enables simple, quick and less frequent maintenance without fuel loss. The shut off valve function closes off both the inlet and the outlet at the same time and ensures sealing before the filter bowl is actually removed. Further, the failure of any one valve component will not cause the loss of filter function. The valve assembly is reliable and durable thus reducing the costs and time of maintenance.

The invention claimed is:

1. A filter assembly comprising:
a manifold having a fluid inlet and a fluid outlet;
a filter housing having a filter medium provided therein, the filter medium defining an inner filter chamber and defining an outer filter chamber between the filter medium and the filter housing,
wherein the filter housing is removably attached to and below the manifold so as to provide a fluid flow path from the inlet into the inner filter chamber, through the filter medium into the outer chamber and out of the outlet;
the filter assembly further comprising:
a valve assembly mounted inside the manifold; and
a by-pass channel defined inside the manifold between the fluid inlet and the fluid outlet, the valve assembly comprising a bypass spool and a bypass spring arranged in engagement with the bypass spool to bias the bypass spool into a first position and to compress, in response to a pressure differential across the bypass spool exceeding the bypass spring force, to move the bypass spool downwards to a second position being a bypass position in which a bypass channel is opened to direct flow from the fluid inlet to the fluid inlet without passing through the filter medium;
the valve assembly further comprising:
a shut off member located around the bypass spool and bypass spring and held between the manifold and the filter housing by means of a shut off spring located around the bypass spool and the bypass spring, and an inlet axial seal and an outlet axial seal positioned such that in an open position, when the filter housing is attached to the manifold, the shut off valve member is axially positioned by means of the shut off spring such that the inlet and outlet axial seals are not in sealing engagement with the valve assembly and in a shut off position, when the filter housing is removed from the manifold, the shut off member is axially moved by the shut off spring to cause the inlet and outlet seals to be brought into sealing engagement with the valve assembly to shut off fluid flow from the inlet and the outlet; wherein the bypass spool and the bypass spring are radially within the shut off spring.

2. The filter assembly of claim 1, wherein the axial inlet seal is a knife edge seal.

3. The filter assembly of claim 1, wherein the axial outlet seal is a lip seal.

4. The filter assembly of claim 1, further comprising a shroud located around the shut off spring.

5. The filter assembly of claim 1, wherein the outlet axial seal is mounted on an adaptor ring and the shut off member is formed with an upper radially extending flange configured such that as the shut off spring expands, the flange moves into abutment with the adaptor ring and the outlet seal located thereon.

6. The filter assembly of claim 1, further comprising a supply chamber between the fluid inlet and the inner filter chamber.

7. The filter assembly of claim 6, further comprising a supply channel fluidly connecting the supply chamber and the inner filter chamber.

8. The filter assembly of claim 1, further comprising an outlet chamber between the outer filter chamber and the fluid outlet.

9. The filter assembly of claim 1, further comprising a sleeve housing the spool and the bypass spring.

10. The filter assembly of claim 1, further comprising sealing means between the manifold and the filter housing.

11. The filter assembly of claim 1, in combination with a fuel supply.

12. The filter assembly of claim 11, in combination with a fuel application.

* * * * *